5 Sheets—Sheet 3.
C. J. APPLETON & J. J. SIBLEY.
SEWING MACHINES FOR UNITING LOOPED FABRICS.
No. 179,440. Patented July 4, 1876.
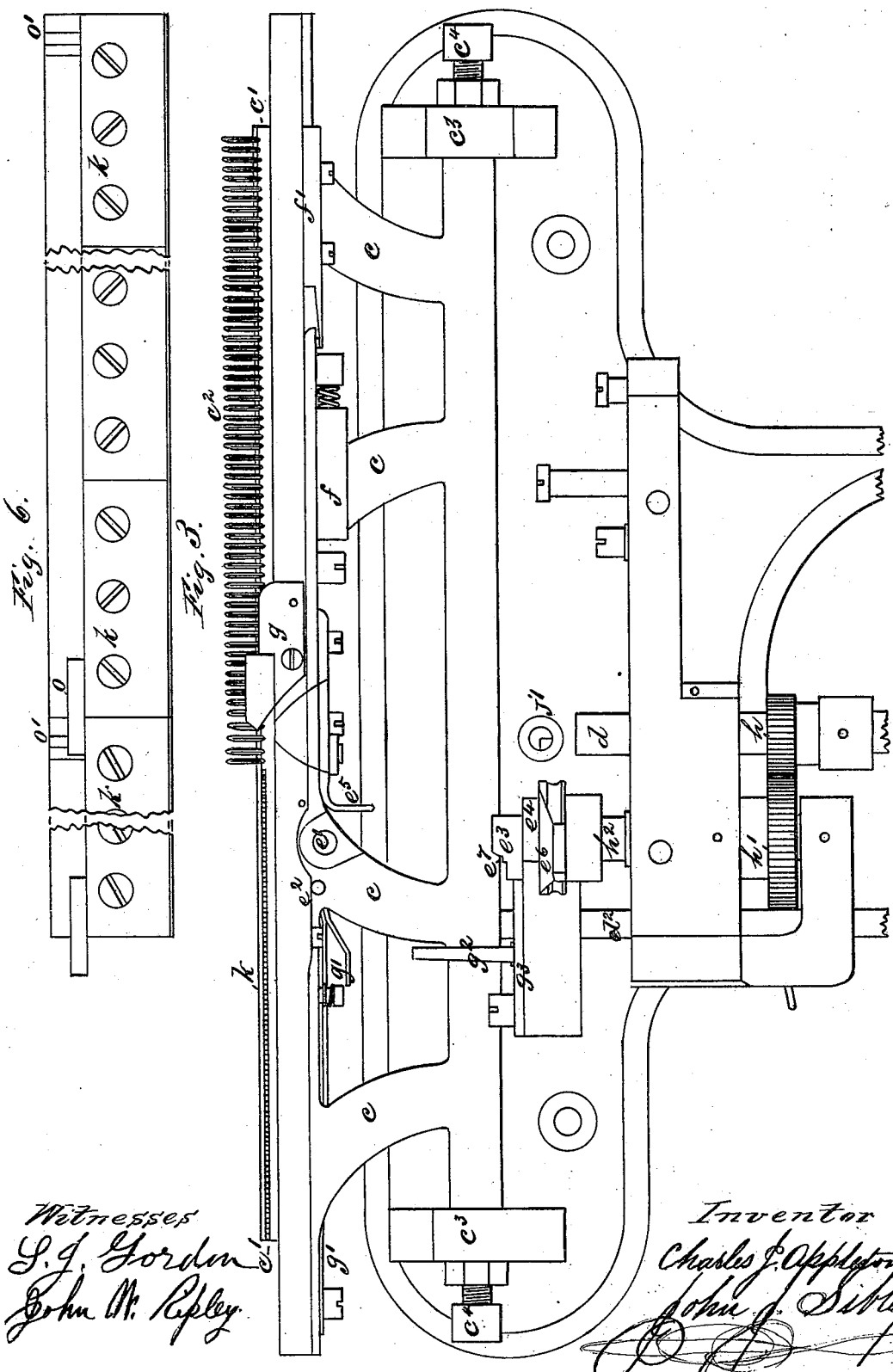
Witnesses
L. J. Gordon
John M. Ripley
Inventor
Charles J. Appleton
John J. Sibley

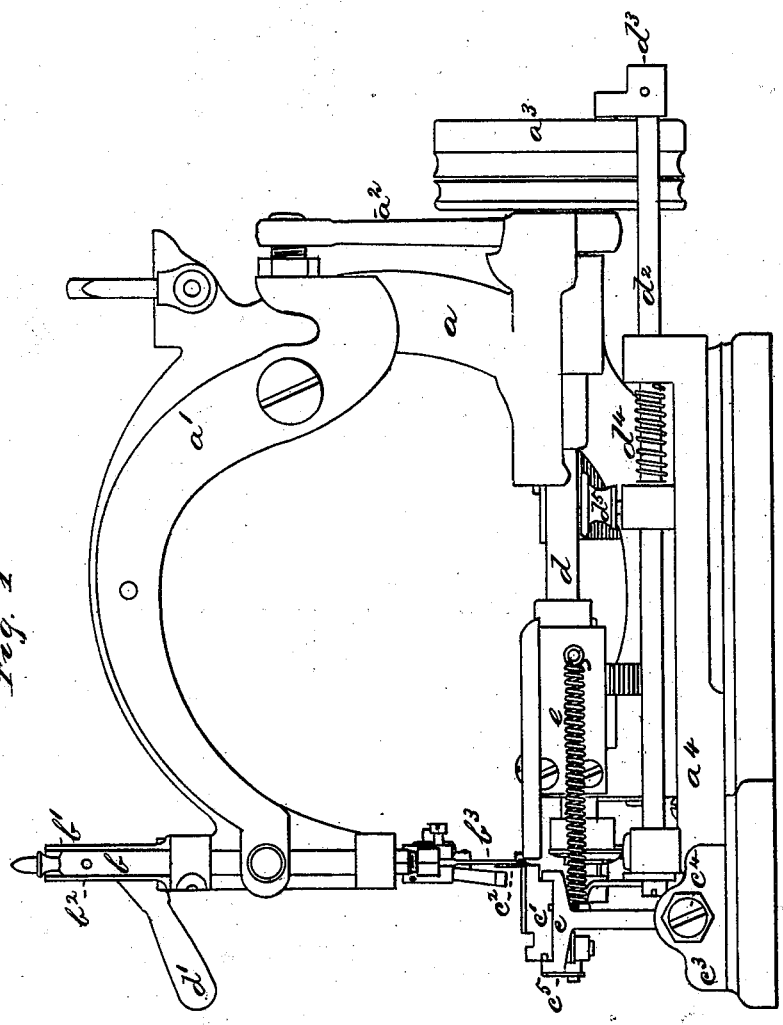

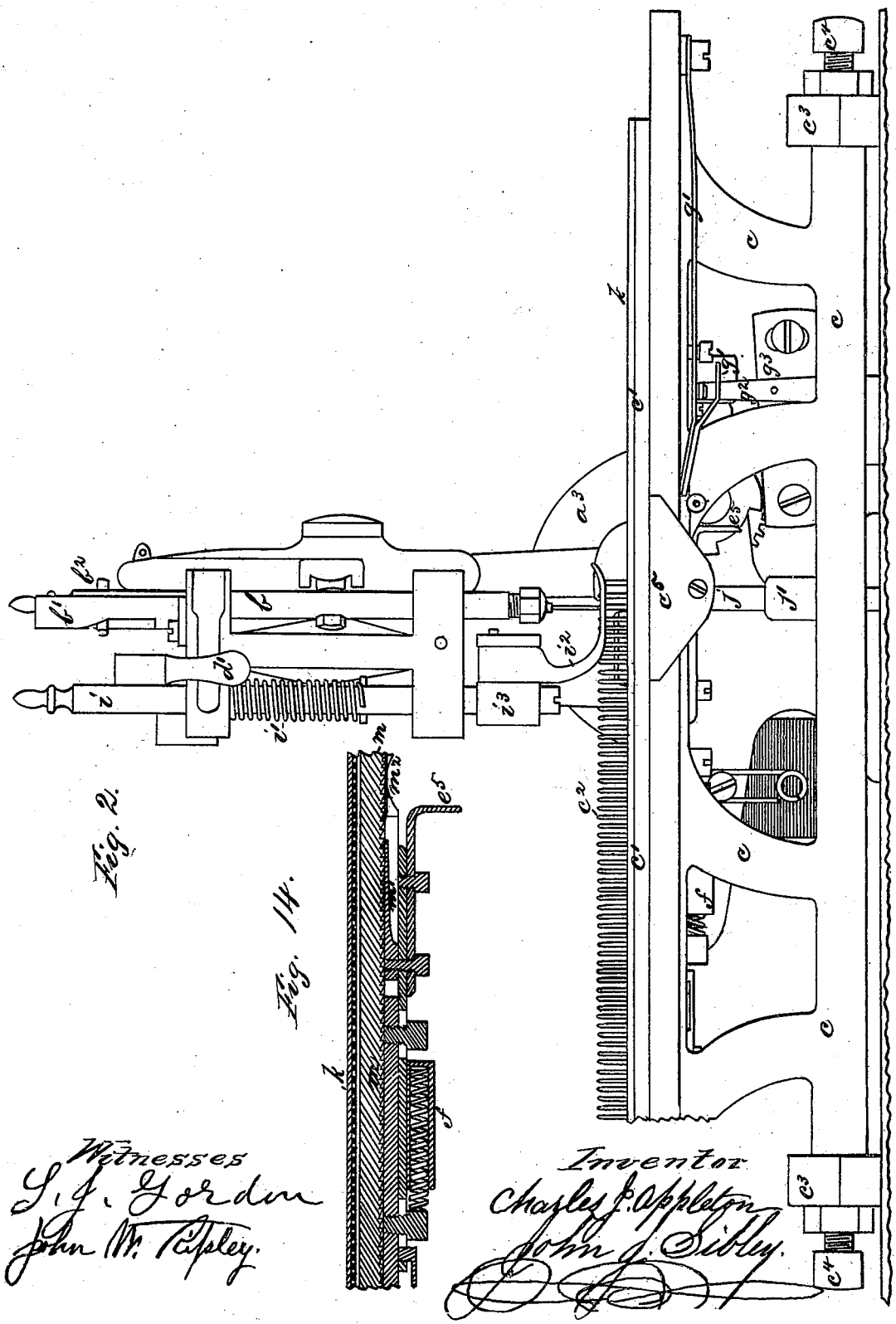

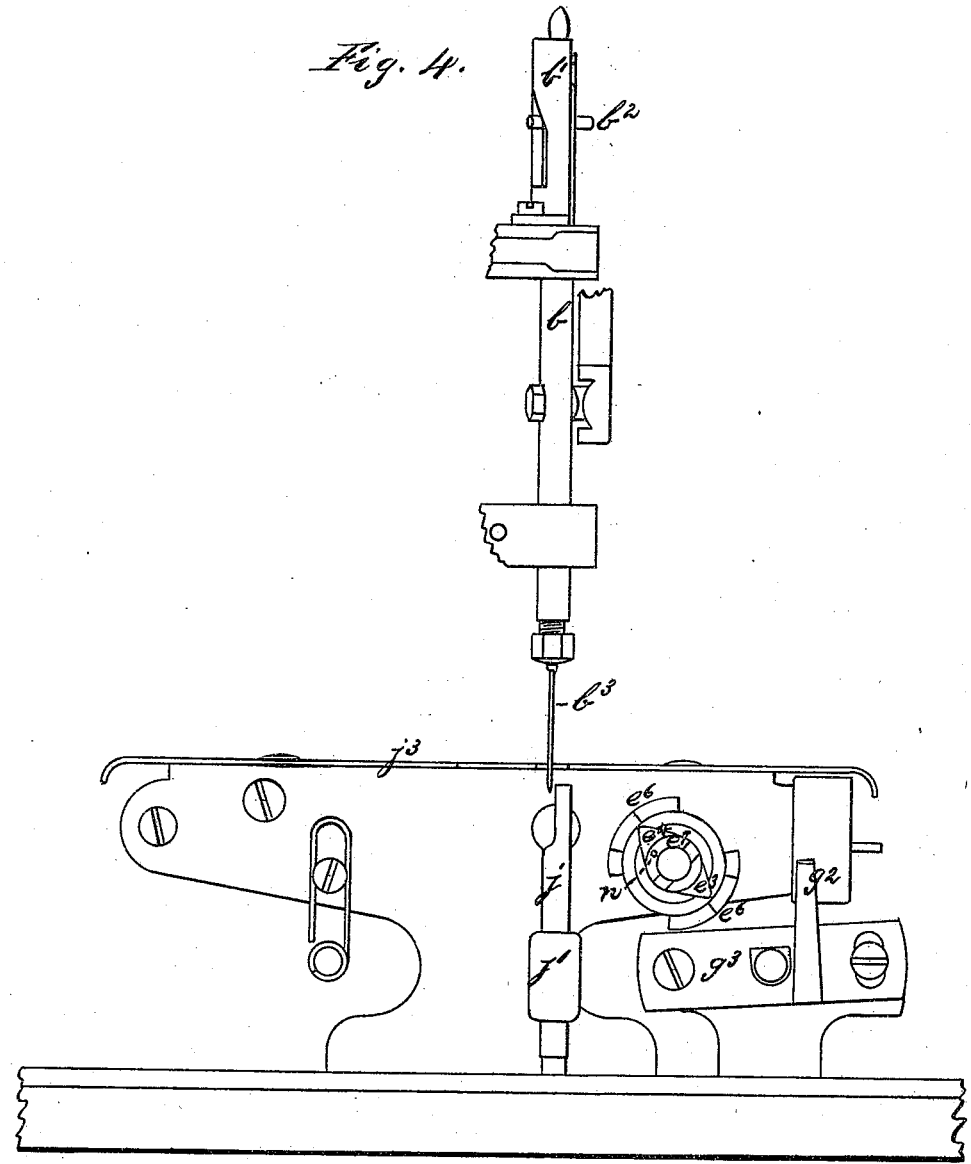

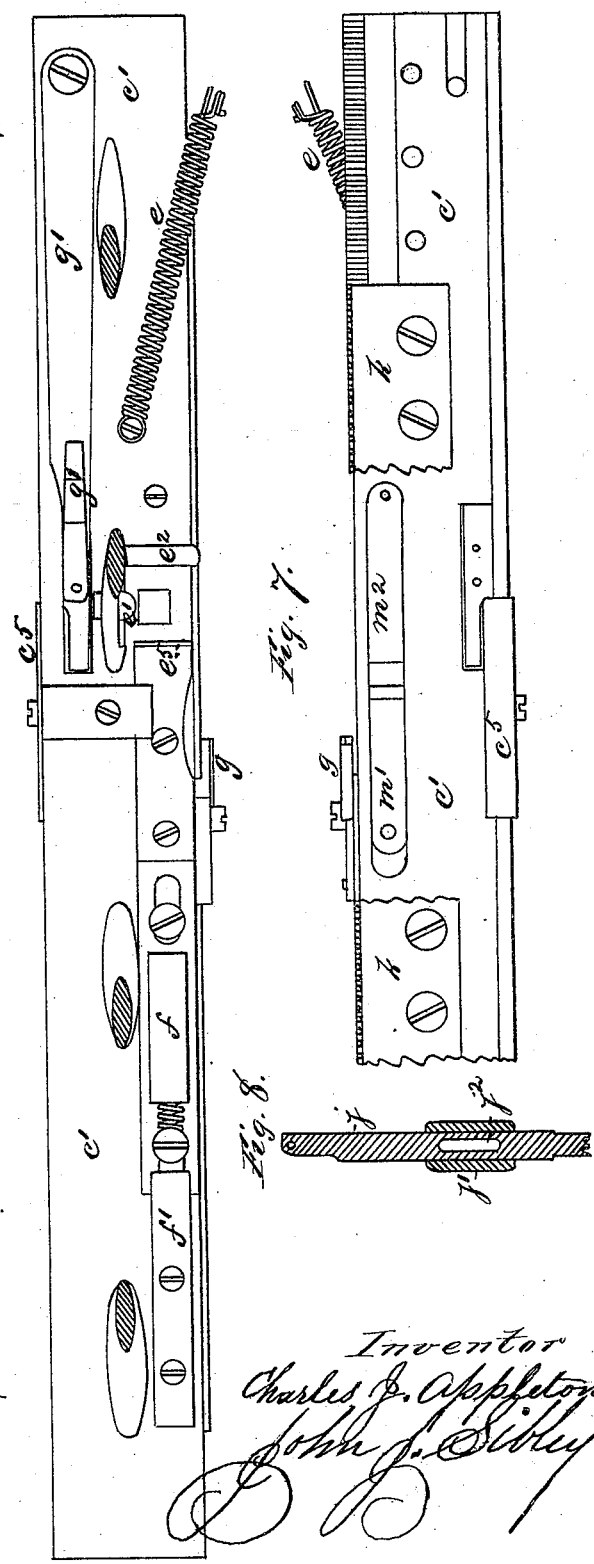

UNITED STATES PATENT OFFICE.

CHARLES J. APPLETON, OF ELIZABETH, NEW JERSEY, AND JOHN J. SIBLEY, OF NEW YORK, N. Y.

IMPROVEMENT IN SEWING-MACHINES FOR UNITING LOOPED FABRICS.

Specification forming part of Letters Patent No. 179,440, dated July 4, 1876; application filed March 1, 1876.

*To all whom it may concern:*

Be it known that we, CHARLES J. APPLETON, of Elizabeth, Union county, State of New Jersey, and JOHN J. SIBLEY, of the city, county, and State of New York, have invented a new and Improved Seaming, Overseaming, and Turning-Off Machine; and we hereby declare that the following is a full, clear, and exact description thereof, reference being had to the accompanying drawings, making a part of this specification, and to the letters of reference marked thereon, in which the same letters represent the same thing in each figure.

Figure 1 represents a side view of our seaming, overseaming, and turning-off machine; Fig. 2, a front elevation of the same; Fig. 3, a plan view, with rack-bar thrown down; Fig. 4, a front view of the needle-bar, yarn-guide, cams, and stop-motion; Fig. 5, the under side of the rack-bar; Fig. 6, a top view of rack-bar, showing the connections of the bars; Figs. 7 to 14 inclusive, various sections and views of detached portions of the machine.

The several letters represent the following parts, viz: $a$, arm of machine; $a^1$, lever-arm; $a^2$, eccentric connecting-rod; $a^3$, pulleys; $a^4$, stop-motion bracket; $b$, needle-bar; $b^1$, needle-bar cam; $b^2$, needle-bar cam-pin; $b^3$, needle; $c$, vibrating rack-bar holder; $c^1$, rack-bar; $c^2$, set-up points; $c^3$, vibrating-bar bracket; $c^4$, adjustable screws and check-nuts; $c^5$, rack-bar guide; $d$, main shaft; $d^1$, presser-post lifter; $d^2$, stop-motion shaft; $d^3$, stop-motion block; $d^4$, stop-motion shaft-spring; $d^5$, shipper; $e$, vibrating bar-spring; $e^1$, overseaming cam-pin; $e^2$, seaming cam-pin; $e^3$, rack-bar feed-cam; $e^4$, rack-bar feed-cam; $e^5$, feed-cam plate; $e^6$, cam for vibrating rack-bar; $e^7$, cam for vibrating it for overseaming; $f$, spring and spring-box; $f'$, adjustable feed-stop; $g$, loop-holder; $g^1$, stop-motion spring; $g^2$, arm of stop-motion catch; $g^3$, stop-motion catch; $h$, shaft-pinion; $h^1$, cam-shaft pinion; $h^2$, cam-shaft; $i$, presser-post; $i^1$, presser-post spring; $i^2$, vibrating presser-foot; $i^3$, presser-foot holder; $j$, yarn-guide; $j^1$, tension-block; $j^2$, slot in yarn-guide; $j^3$, work-plate; $k$, point-plates; $m$, ratchet; $m^1$, ratchet feed-spring; $m^2$, ratchet stop-spring; $n$, cam change-pin; $o$, movable bar-catch; $o'$, bar-catch.

One object of our invention is to construct a machine to seam or overseam elastic or other knitted looped fabrics, and to seam, overseam, join together, or bind other kinds of material at pleasure.

The second object is to seam, overseam, and join together material or goods with the same kind of yarn that is used in the manufacture thereof—as cotton, wool, or silk.

The third object is such an arrangement of the bars as to enable the machine to be kept constantly in operation.

The fourth object is such an arrangement of the needles as to enable them to seam or overseam, with the softest kind of knitting-yarns, without wearing or chafing; and The fifth object is such an arrangement of the rack-bar as to stop the machine, if another bar is not placed in the holder and connected to the rack-bar in operation, before it has run entirely out.

The machine being threaded up and power applied to tight pulley $a^3$ attached to main shaft $d$, it drives eccentric $a^2$, giving motion to lever-arm $a^1$ attached to arm of machine $a$, and also to needle-bar $b$, which receives a quarter twist when the needle is nearing its highest point, and resumes it original position during its descent. This is accomplished by the action of needle-bar cam-pin $b^2$ attached to needle-bar $b$ and working in needle-bar cam $b^1$, as shown in Fig. 13. Needle $b^3$ is attached to needle-bar $b$, in the usual manner. Cam-shaft pinion $h$, shown in Fig. 3, is attached to main shaft $d$ and geared into cam-shaft pinion $h^1$, and causes cam-shaft $h^2$ to revolve at half the speed of main shaft $d$. At the outer end of cam-shaft $h^2$ is fixed a cam, $e^6$, for vibrating rack-bar $c^1$. Cam $e^7$ is used for overseaming, when the rack-bar feed-cam $e^3$ is reversed, and the point of cam $e^3$ is in line with rack-bar feed-cam $e^4$. The cams $e^3$, $e^4$, $e^6$, and $e^7$ receive their motions from cam-shaft $h^2$.

In Fig. 3 the vibrating rack-bar holder swings and is held and adjusted by adjustable screws and nuts $c^4$, and is held in position by vibrating bar-bracket $c^3$. When the vibrating rack-bar holder is in working position, seaming cam-pin $e^2$ rests against the face of vibrating rack-bar cam $e^6$, receiving its outward motion from cam $e^6$, and being returned and kept against its cam by spring $e$, as shown in Fig. 1. The rack-bar feed-cams $e^3$ and $e^4$ on the outer end of cam-shaft $h^2$, when in position, rest against, and, at every half revolution of cam-shaft $h^2$, push feed-cam plate $e^5$, which is pressed home by a spring in spring-box $f$.

Attached to feed-cam plate $e^5$ on its upper side, and moving with it, is ratchet feed-spring $m^1$, working in ratchet $m$, located on the under side of rack-bar $c^1$, as shown in Fig. 14. $m^2$ is the ratchet stop-spring, arranged to catch a tooth in ratchet-bar $m$ every time ratchet $m^1$ feeds it along. On the upper side of rack-bar $c^1$ point-plates $k$ are arranged, by screws, to hold set-up points $c^2$ in a proper position, as shown in Figs. 3 and 6. Two or more loops being on each point, the point of needle $b^3$ in its descent enters the groove on the inner side of set-up points $c^2$, and passes through the loop or loops to yarn-guide $j^1$, taking the yarn up through the loop or loops. As soon as the point of needle $b^3$ is through the loop on point $c^2$, the rack-bar is pushed from the needle by cam and cam-pin $e^6$ and $e^2$, until the rack-bar moves forward to the next point. The needle being at its highest point, the loop it retains hangs in a proper position by reason of the quarter twist given needle-bar $b$, and as needle $b^3$ only draws the yarn just through the loops on the set-up points, there is no more yarn used than is required to form a portion of the next loop, by this means doing away with nearly all friction on the thread, as well as the take-up device usually found on such machines. When it is desired to overseam, rack-bar feed-cam $e^3$ is detached from $e^4$, turned half-way round until the points of feed-cams $e^3$ and $e^4$ are in line, and consequently feeding once at every revolution of cam-shaft $h^2$. Overseaming cam-pin $e^1$, attached to rack-bar holder $c$, is held against the outer edge of feed-cam $e^3$, holding the rack-bar out without feeding, to enable needle $b^3$ to pass on the outside of the loops on set-up points $c^2$, every alternate stitch. By this arrangement needle $b^3$ takes two stitches to each point $c^2$, alternately in the loop on the point $c^2$, and outside, as shown in Figs. 10, 11, and 12.

The stop-motion is arranged to stop the machine when rack-bar $c^1$ passes depressed spring $g^1$ in sliding through the rack-bar holder. In case another bar is not attached to the one in operation by catches $o$ and $o'$, spring $g^1$ rises and lifts with it the arm of stop-motion catch $g^2$, which raises stop-motion catch $g^3$ until the hole in catch $g^3$ is in line with the end of shaft $d^2$. Spring $d^4$, around shaft $d^2$, then forces the shaft through the hole in stop-motion catch $g^3$, until stop-motion block $d^3$ strikes the edge of tight pulley $a^3$. The belt remains on the loose pulley until another rack-bar, $c^1$, is placed in the rack-bar holder; then, if shipper-handle $d^5$ is pressed toward the tight pulley, it moves the belt-releasing stop-motion block $d^3$, and shaft $d^2$ will be held in position by catch $g^3$ at its end. Presser-post $i$ is hung in the usual manner, and the pressure on the goods is caused by spring $i^1$. Presser-foot $i^2$ is hung in presser-foot holder $i^3$, and arranged to vibrate with set-up points $c^2$, as shown in Fig. 2. Loop-holder $g$, attached to rack-bar holder $c$, and in front of set-up points $c^2$, is arranged to secure the loops in their position, as shown in Fig. 3. Needle $b^3$, as shown in Fig. 9, is an ordinary knitting-machine latch-needle, with a point arranged to knit or sew through the loops on the points $c^2$.

Having described this invention, and shown one practical form of working the machine, what we claim as new, and desire to secure by Letters Patent, is—

1. The combination of the vibrating rack-bar holder, and rack-bar, with cam $e^6$ and cam-pin $e^2$.

2. The combination of the vibrating rack-bar holder, and rack-bar, with cam $e^7$ and cam-pin $e^1$.

3. The combination of the rack-bar with spring-catch $g^3$, stop-motion block $d^3$, and shaft $d^2$, operating together substantially as described.

4. The combination of vibrating loop-holder $g$, vibrating set-up points $c^2$, and vibrating presser-foot $i^2$, operating together substantially as and for the purposes described.

CHARLES JAMES APPLETON.
JOHN JAY SIBLEY.

Witnesses:
S. J. GORDON,
JOHN W. RIPLEY.